United States Patent [19]
Arroyo

[11] 3,837,381
[45] Sept. 24, 1974

[54] SHUTOFF VALVE DEVICE

[75] Inventor: Luis Saenz Arroyo, Mexico City, Mexico

[73] Assignee: Products Adex, S.A. Mexico

[22] Filed: Dec. 26, 1972

[21] Appl. No.: 318,442

[52] U.S. Cl............... 141/350, 128/272, 137/525.1, 251/149.1
[51] Int. Cl........................ B65b 3/04, F16k 21/04
[58] Field of Search ............................ 141/325–327, 141/367, 392, 27, 46, 193, 287, 328, 329, 348–350, 383, 311, 312; 222/490, 494; 285/238, 291; 128/272, 274, 349 BV; 137/223, 317, 525.1; 251/149.1

[56] References Cited
UNITED STATES PATENTS

| | | |
|---|---|---|
| 2,904,225 | 9/1959 | Earles, Jr............................. 222/494 |
| 3,104,787 | 9/1963 | Thompson, Jr..................... 222/490 |
| 3,211,340 | 10/1965 | Zander et al. ................... 222/494 X |
| 3,334,661 | 8/1967 | Milette............................. 285/291 X |
| 3,356,093 | 12/1967 | Monahan...................... 129/349 BV |
| 3,540,757 | 11/1970 | Neher.............................. 285/291 X |
| 3,586,068 | 6/1971 | Nicholson....................... 222/494 X |
| 3,618,825 | 11/1971 | Clarke ............................ 222/494 X |

*Primary Examiner*—Houston S. Bell, Jr.
*Assistant Examiner*—Frederick R. Schmidt
*Attorney, Agent, or Firm*—Ladas, Parry, Von Gehr, Goldsmith & Deschamps

[57] ABSTRACT

A fluid shutoff device is provided for attachment to inflatable fluid containers for domestic and medical uses. The device comprises four cooperating elements - a flexible tubular member extending from the inflatable tubular container; a hollow tubular cover; an elastomeric body inserted into the end of said tubular member and having therein a truncated conical bore communicating with a valve channel; and a ring member which prevents fluid pressure from loosening the engagement of the elastomeric body and the end of said tubular member. Pressure of fluid in said inflatable container automatically compresses said body and maintains said valve channel in closed condition. Fluid is introduced into or discharged from said container by inserting a convention syringe adapter into said truncated conical bore to open the valve channel.

1 Claim, 6 Drawing Figures

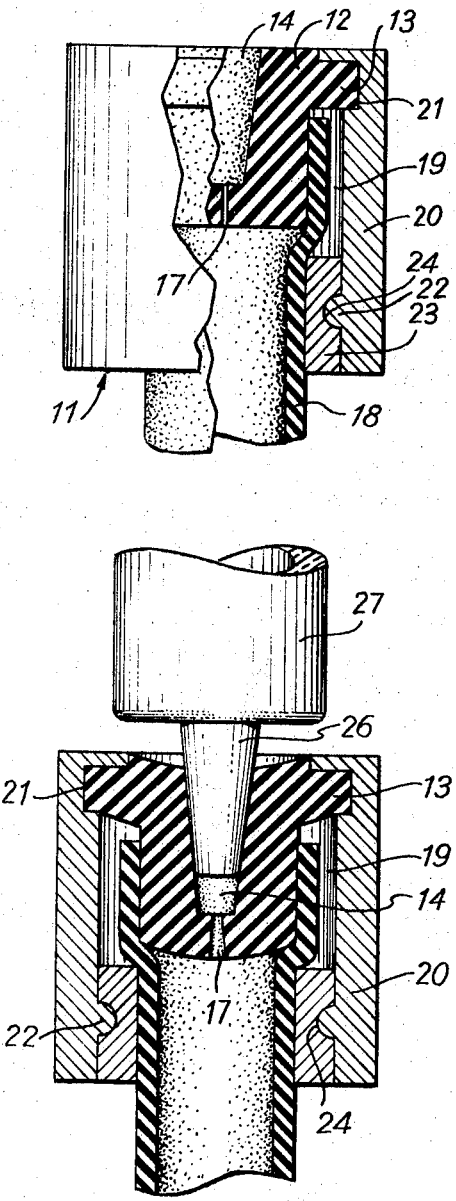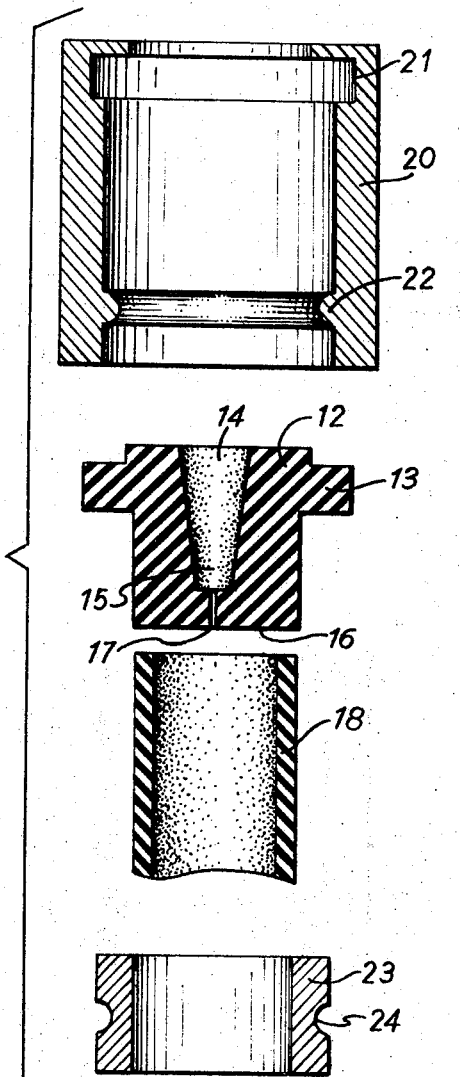

3,837,381

SHUTTOFF VALVE DEVICE

BRIEF SUMMARY OF THE INVENTION

This invention relates to fluid shutoff valve devices for application to domestic and industrial medical inflatable fluid containers. This shutoff valve is very simple and lacks means such as springs or more complex attachments that preclude the long life and greater efficiency of the valve for controlling the fluid flow during normal operating conditions.

The novel characteristics of this invention remarkably improve the functionality of products such as cannulas for medical use such as in urology, endothracheal, anesthetic purposes and the like. However, its application can be extended to any other field such as domestic or industrial applications.

Therefore it is an object of this invention to supply a fluid shutoff valve substantially comprising four elements that due to its simplicity and construction allows a greater efficiency in the control of fluid flow.

The fluid shutoff valve of the present invention comprises a cylindrical body of thermoplastic material with a flange at the top including in its central part a truncated conical bore, the small end of which communicates with a channel extending through the base of said body, said channel comprising the closure and intake means of the valve. At the lower portion of the cylindrical body is super-imposed the end of a flexible tubular member extending from an inflatable fluid container, the resiliency of which when pressing the walls of the cylinder keeps the channel closed that constitutes the intake of the valve; also the valve of the present invention includes a plastic, metal or other rigid material cap or cover, that protects the valve against any distortion from external stresses during the manipulation of same, including at its top an inner peripheral recess wherein the flange of said cylindrical body rests.

The cover also has towards its lower part a peripheral inner annular rib that engages a recess in a ring member that forms a seat on which the cylindrical body of the valve rests, and prevents any excessive pressure in the container from opening the valve channel.

The ring member also limits the downwardly movement of the cylindrical body of the valve when introducing an adapter in its truncated cone bore, for operating same.

These and other objects that are obtained in the practice of the present invention will be better understood and appreciated when reading the following description wherein reference is made to the attached drawings of the preferred embodiment of the valve.

BRIEF DESCRIPTION OF THE DRAWINGS

FIG. 1, is a vertical elevation view of the valve of the present invention with conventional sections showing its several parts.

FIG. 2, is a longitudinal sectional view of the valve of the present invention with a portion of an adapter coupled thereto in order to operate same.

FIG. 3, is an exploded longitudinal sectional view of the valve of the present invention showing separately each of its parts.

DETAILED DESCRIPTION OF THE INVENTION

Figure 4:
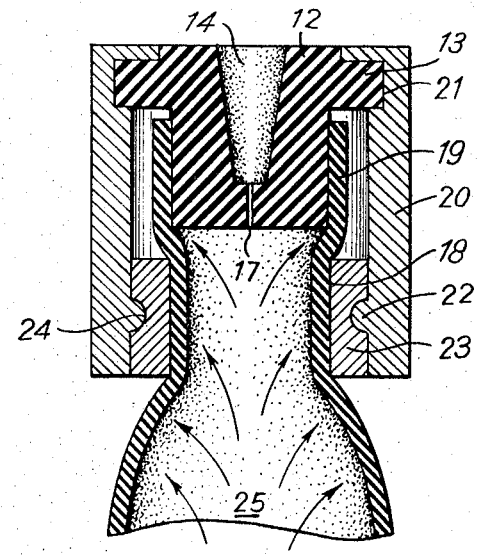
FIG. 4 is a longitudinal sectional view showing the behaviour of the valve when increasing the pressure of the vessel to which the fluid is dispensed.

The fluid shutoff valve 11, of the present invention comprises a substantially cylindrical body 12, of an elastomeric material with a flange 13 at its top portion including at the center of same a truncated cone bore 14, having its minor diameter portion 15 near the base 16 of the cylindrical body, to which it is communicated by means of a channel 17 that substantially constitutes the closure and intake means of the valve and including also elastic tubular member 18 connected to the inflatable container for the fluid, with the end portion 19 thereof superimposed on the outer diameter of the cylindrical body 12 including also a hollow tubular cover 20, with an inner peripheral recess 21 at its top portion, wherein flange 13 of the cylindrical body 12 rests. Said cover comprises at its bottom an annular rib 22 supporting a ring 23 by means of a recess 24 formed at the periphery of the above mentioned ring.

Said ring 23 forms a seat on which rests the cylindrical body 12 with end 19 of tubular member 18 inserted in same.

When there is an increase of pressure of the fluid in the inflatable container due to the action of the ring 23, the fluid indicated by the arrows 25 of FIG. 4, tends to increase the diameter of the elastic pivot outside the cover 20 of the valve stretching the elastic part 19 of the pipe portion superimposed on cylinder 12 assuring hermetic sealing of the valve for high pressures within the endurance limits of the material employed.

Figure 5:
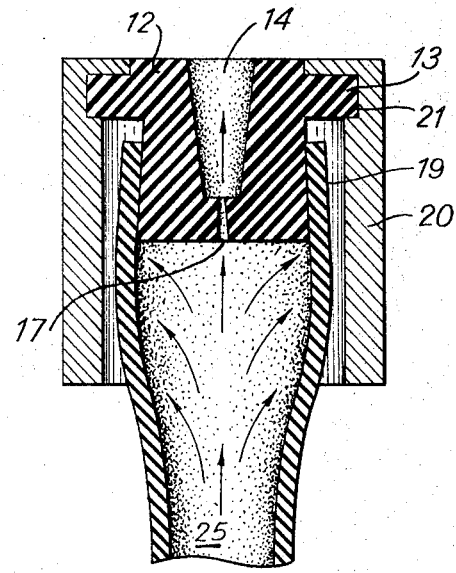
FIGS. 5 and 6, are longitudinal sectional views of the valve of the present invention showing what would happen in the event of an overpressure if the reinformcement ring of the valve were not present, causing an undesirable leak of the fluid.
Figure 6:
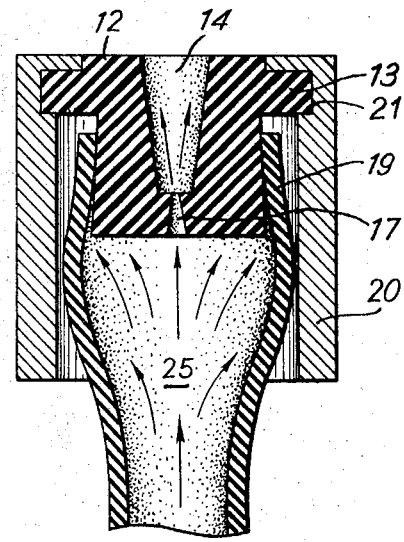

If the reinforcement ring 23 were not used, as illustrated in FIGS. 5 and 6, the fluid pressure 25 would tend to separate the walls of end 19 of tubular member 18 thereby causing an improper opening of the channel 17 thus producing an undesirable leaking of fluid.

In order to operate valve 11, it is necessary to introduce an adapter 26 of a syringe 27, such as those used for conventional injections, into the truncated cone bore 14 of the cylindrical body 12 as illustrated in FIG. 2, thus compelling the channel 17 of base 16 of the cylindrical body to open and allowing the passage of fluid. Once sufficient fluid has been introduced, adapter 26 of the syringe of the bore 14 is removed and the channel 17 is again closed by the action of the elastic end 19 of tubular member 18 superimposed on cylinder 12. In order to remove the fluid it is merely necessary to introduce in bore 14 a syringe adapter 26, allowing the plunger of same to freely slide or for a better effect, to suction the fluid by means of the plunger until a desired condition is attained.

Although the above description has been made in relation to a specific embodiment thereof, it is to be understood by those skilled in the art that all the above stated and any other change in form or detail must be considered as comprised in the spirit and scope of the present invention.

I claim:

1. A fluid shutoff valve device for use with an inflatable fluid container, adapted to maintain normal fluid tight conditions in said container and to permit introduction into and discharge of fluid from the container, comprising:

a. a flexible tubular member (18) for direct connection with the fluid container;

b. a hollow tubular cover (20) having an annular recess (21) in its inner wall;

c. a body (12) of elastomeric material having a peripheral annular flange for insertion into said recess (21), and a base portion (16) for insertion into an end (19) of said flexible tubular member 18, said body (12) having a truncated conical bore (14), extending axially into said body, the smaller end of which communicates with a valve channel (17) extending through the base portion (16) and communicating with said flexible tubular member; and d. a ring member (23) adapted to fit snugly round the outside of flexible tubular member (18) below the location of the base portion (16) inside said tubular member, said ring member (23) being maintained in position by a recess (24) in said ring member engaging a rib member (22) extending from the inner wall of the hollow tubular cover (20);

whereby the pressure of fluid in said inflatable container acts on the elastomeric material of body (12) to automatically close said valve channel (17) and maintain fluid tight conditions, said valve channel (17) being opened when desired to permit introduction or discharge of fluid by inserting a syringe adapter into said conical bore (14).

\* \* \* \* \*